United States Patent
Braga (10) Patent No.: US 7,406,242 B1
(45) Date of Patent: Jul. 29, 2008

(54) INTERCONNECT ENCLOSURES FOR OPTICAL FIBERS INCLUDING CROSS-CONNECT MODULES AND METHODS FOR USING THE SAME

(75) Inventor: David J. Braga, Raleigh, NC (US)

(73) Assignee: Tyco Electronics Co., Ltd., Middletown, PA (US)

( * ) Notice: Subject to any disclaimer, the term of this patent is extended or adjusted under 35 U.S.C. 154(b) by 0 days.

(21) Appl. No.: 11/985,846

(22) Filed: Nov. 16, 2007

(51) Int. Cl.
 *G02B 6/00* (2006.01)
(52) U.S. Cl. ........................... 385/135; 385/134
(58) Field of Classification Search .......... 385/134, 385/135
See application file for complete search history.

(56) References Cited

U.S. PATENT DOCUMENTS

| | | |
|---|---|---|
| 5,511,144 A | 4/1996 | Hawkins et al. |
| 5,640,482 A | 6/1997 | Barry et al. |
| 5,758,002 A | 5/1998 | Walters |
| 5,758,003 A | 5/1998 | Wheeler et al. |
| 5,825,962 A | 10/1998 | Walters et al. |
| 5,913,006 A | 6/1999 | Summach |
| 6,044,193 A | 3/2000 | Szentesi et al. |
| 6,160,946 A | 12/2000 | Thompson et al. |
| 6,181,862 B1 | 1/2001 | Noble et al. |
| 6,195,494 B1 | 2/2001 | Abbott et al. |
| 6,201,919 B1 | 3/2001 | Puetz et al. |
| 6,256,444 B1 | 7/2001 | Bechamps et al. |
| 6,278,829 B1 | 8/2001 | BuAbbud et al. |
| 6,289,159 B1 | 9/2001 | Van Hees et al. |
| 6,362,422 B1 | 3/2002 | Vavrik et al. |
| 6,398,149 B1 | 6/2002 | Hines et al. |
| 6,418,262 B1 | 7/2002 | Puetz et al. |
| 6,424,781 B1 | 7/2002 | Puetz et al. |
| 6,438,311 B1 | 8/2002 | Zarnowitz |
| 6,467,633 B1 | 10/2002 | Mendoza |
| 6,468,112 B1 | 10/2002 | Follingstad et al. |
| 6,487,356 B1 | 11/2002 | Harrison et al. |
| 6,501,899 B1 | 12/2002 | Marrs et al. |
| 6,532,332 B2 | 3/2003 | Solheid et al. |
| 6,535,682 B1 | 3/2003 | Puetz et al. |

(Continued)

FOREIGN PATENT DOCUMENTS

EP   1160603   12/2001

(Continued)

*Primary Examiner*—Frank G Font
*Assistant Examiner*—Michael P Mooney
(74) *Attorney, Agent, or Firm*—Myers Bigel Sibley & Sajovec (57) ABSTRACT

An interconnect device for optical fibers includes an enclosure. A first termination panel is mounted in the enclosure. The first termination panel has a plurality of optical fiber connection members, ones of which are associated with respective subscriber locations. A second termination panel is mounted in the enclosure that has a plurality of optical fiber connection members, ones of which are associated with respective input optical fibers associated with a service provider. A cross-connect module mounted in the enclosure has a loop of an optical fiber retained therein with a first and opposite second connectorized end of the optical fiber extending from the cross-connect module. The first and second connectorized ends of the optical fiber extend to a length sufficient to allow cross-connection of a selected pair of the connection members of the termination panels by connection of the connectorized ends thereto.

20 Claims, 7 Drawing Sheets

U.S. PATENT DOCUMENTS

| | | |
|---|---|---|
| 6,556,763 B1 | 4/2003 | Puetz et al. |
| 6,571,047 B1 | 5/2003 | Yarkosky et al. |
| 6,584,267 B1 | 6/2003 | Caveney et al. |
| 6,591,051 B2 | 7/2003 | Solheid et al. |
| 6,614,978 B1 | 9/2003 | Caveney |
| 6,633,717 B1 | 10/2003 | Knight et al. |
| 6,711,339 B2 | 3/2004 | Puetz et al. |
| 6,760,531 B1 | 7/2004 | Solheid et al. |
| 6,792,191 B1 | 9/2004 | Clapp et al. |
| 6,796,437 B2 | 9/2004 | Krampotich et al. |
| 6,850,685 B2 * | 2/2005 | Tinucci et al. ............. 385/134 |
| 7,142,764 B2 | 11/2006 | Allen et al. |
| 7,298,946 B2 * | 11/2007 | Mueller ...................... 385/100 |
| 7,298,952 B2 * | 11/2007 | Allen et al. ................. 385/135 |
| 2002/0118943 A1 | 8/2002 | Aolheid et al. |
| 2002/0176681 A1 | 11/2002 | Puetz et al. |
| 2003/0095772 A1 | 5/2003 | Solheid et al. |
| 2003/0185535 A1 | 10/2003 | Tinucci et al. |
| 2004/0001686 A1 | 1/2004 | Smith et al. |
| 2004/0037533 A1 | 2/2004 | Knudsen |

FOREIGN PATENT DOCUMENTS

| | | |
|---|---|---|
| WO | WO 01/35142 | 5/2001 |
| WO | WO 02/103429 | 12/2002 |

* cited by examiner

INTERCONNECT ENCLOSURES FOR OPTICAL FIBERS INCLUDING CROSS-CONNECT MODULES AND METHODS FOR USING THE SAME

BACKGROUND OF THE INVENTION

The present invention relates to optical fiber products and, more particularly, to optical fiber cross-connect modules and methods for using the same.

Optical fiber networks are increasingly being installed to support high-speed voice and data communications. Increasingly, the optical fiber coupling is being expanded out from the central office of the communication service provider companies, such as Regional Bell Operating Companies (RBOCs) to the subscriber locations, such as homes or businesses, where conventional copper wiring was traditionally used. Such alternate methods of providing bandwidth to subscriber locations are often referred to in the telecoms industry as Fiber to the Home (FTTH), Fiber to the Business (FTTB) and the like (FTTx).

When providing services using an optical fiber network, it is generally necessary to add and drop subscribers over time. As a result, a variety of methods are provided for interconnecting subscriber locations with a central office connecting facility operated by an optical network provider. To improve the utilization of communication circuits within such a central office facility, interconnection enclosures, such as a centralized splitter cabinet (CSC) and/or centralized splitter cross-connect (CSX), may be provided as part of the outside plant (OSP) infrastructure of the optical fiber network. Doing so may allow some of the burden of establishing and changing connections on the network to be shifted away from the central office and facilitate incremental growth of an installed network as new subscribers are added.

A centralized splitter cabinet (CSC) is typically a passive optical enclosure that provides random termination of optical splitters suitable for use in an OSP environment. A CSC may be pedestal or pole mounted in the field. A CSC may provide a flexibility point for termination of distribution cable as well as enclosing a splitter array. This flexibility in interconnections of the downstream fiber network may facilitate optimization of the use of electronic equipment in the central office by, for example, avoiding the need to dedicate circuits in the central office to each subscriber location when many such locations may not be active.

A field service technician may be sent to the CSC to modify the selection of a subscriber location coupled through a splitter to a particular fiber from the central office by connecting and disconnecting various cables found in the CSC. For example, it is known to provide connectorized pigtail cables associated with each subscriber location serviced by a CSC in the CSC. A technician can then select the splitter pigtail for a designated subscriber location, for example, based on a label attached to the pigtail, and insert the selected cable in a connection point of a splitter.

A field service technician may also need to make cross-connections in the CSC. Cross-connecting can be performed with individual varied length patchcords, which route directly from feeder fiber connector ports to distribution fiber connector ports within the cabinet. Typically, these varied length patchcords are routed in an unorganized fashion and may conflict with the recommended splitter module pigtail routing paths in the cabinet. Other methods of cross-connecting within a centralized splitter cabinet generally require the use of a fixed position routing "drum" in-place of, but not along side of, splitter modules.

SUMMARY OF THE INVENTION

Embodiments of the present invention provide an interconnect device for optical fibers including an enclosure. A first termination panel is mounted in the enclosure. The first termination panel has a plurality of optical fiber connection members, ones of which are associated with respective subscriber locations. A second termination panel is mounted in the enclosure that has a plurality of optical fiber connection members, ones of which are associated with respective input optical fibers associated with a service provider. A cross-connect module mounted in the enclosure has a loop of an optical fiber retained therein with a first and opposite second connectorized end of the optical fiber extending from the cross-connect module. The first and second connectorized ends of the optical fiber extend to a length sufficient to allow cross-connection of a selected pair of the connection members of the termination panels by connection of the connectorized ends thereto.

In further embodiments, the optical fiber retained in the cross-connect module extends continuously without any splicing therein from the first connectorized end to the second connectorized end. The cross-connect module may include an open end and the first and second connectorized ends of the optical fiber may extend from the open end of the cross-connect module. The cross-connect module may include a closed end including optical fiber receiving openings and the first and second connectorized ends of the optical fiber may extend from respective ones of the optical fiber receiving openings. The cross-connect module may also include a plurality of optical fibers retained therein, each of which has a first and second connectorized end extending from the cross-connect module to allow cross-connection of a plurality of selected pairs of the connection members.

In other embodiments, the cross-connect module includes a plurality of tab members therein positioned to retain the loop of the optical fiber in the cross-connect module. A bend control member may be positioned between respective ones of the tab members configured to maintain the loop at a radius that at least equals a minimum bend radius of the optical fiber. The cross-connect module may be a tray and the tab members may include a first segment extending up from a bottom of the tray and a second segment, removably coupled to the first segment, that extends substantially orthogonally from the first segment over the loop of the optical fiber. The first segments of the tab members may be portions of the bend control member.

In further embodiments, the interconnect device further includes a splitter mounted in the enclosure that is configured to optically couple a plurality of optical fibers to a single optical fiber and having a plurality of optical fiber connectorized pigtails extending therefrom, each of the connectorized pigtails being optically coupled by the splitter to an optical fiber feeder cable to be coupled to a central office. The connectorized pigtails may have a cable length from the first end to the second end, without a connector therebetween, sufficient to allow connection to the plurality of connection members. An optical fiber cable from the central office may be coupled to the input optical fibers associated with the service provider and optical fiber cables from the subscriber locations may be coupled to the plurality of connection members of the first termination panel.

In other embodiments, the splitter is an optical fiber splitter tray and the cross-connect module is a cross-connect tray and the enclosure includes a mounting member configured to interchangeably receive a plurality of optical fiber splitter and/or cross-connect trays. The enclosure may further include an unused cable retaining member configured to receive and retain ones of the connectorized pigtails of the splitter tray or connectorized ends extending from the cross-connect tray that are not coupled to the connection members of the termination panels. The enclosure may also include a pigtail routing path and both the connectorized pigtails and the connectorized ends extending from the cross-connect tray may be routed through the pigtail routing path to a corresponding selected one of the first termination panel, the second termination panel or the unused cable retaining member.

In yet further embodiments, an interconnect device for optical fibers includes an enclosure. A first termination panel is mounted in the enclosure that has a plurality of optical fiber connection members, ones of which are associated with respective subscriber locations. A second termination panel is mounted in the enclosure that has a plurality of optical fiber connection members, ones of which are associated with respective input optical fibers associated with a service provider. A splitter and cross-connect module mounting member is mounted in the enclosure that is configured to interchangeably receive a plurality of optical fiber splitter and/or optical fiber cross-connect members. A cross-connect module is mounted in the mounting member that has a loop of an optical fiber retained therein with a first and opposite second connectorized end of the optical fiber extending from the cross-connect module. The optical fiber retained in the cross-connect module extends continuously without any splicing therein from the first connectorized end to the second connectorized end and the first and second connectorized ends of the optical fiber extend to a length sufficient to allow cross-connection of a selected pair of the connection members of the termination panels by connection of the connectorized ends thereto. A splitter is mounted in the mounting member proximate the cross-connect module that is configured to optically couple a plurality of optical fibers to a single optical fiber. The splitter has a plurality of optical fiber connectorized pigtails extending therefrom, each of the connectorized pigtails being optically coupled by the splitter to an optical fiber feeder cable to be coupled to a central office. A pigtail routing path is provided in the enclosure. Both the connectorized splitter pigtails and the connectorized ends extending from the cross-connect module are routed through the pigtail routing path to a corresponding selected one of the first termination panel or the second termination panel.

In other embodiments, the enclosure further includes an unused cable retaining member configured to receive and retain ones of the connectorized pigtails of the splitter or connectorized ends extending from the cross-connect module that are not coupled to the connection members of the termination panels. Both the connectorized pigtails and the connectorized ends extending from the cross-connect module are routed through the pigtail routing path to a corresponding selected one of the first termination panel, the second termination panel or the unused cable retaining member. Ones of the connectorized pigtails and the connectorized ends extending from the cross-connect module may be coupled to corresponding respective ones of the connection members on the first or the second termination panel without a jumper cable therebetween.

In further embodiments, methods for configuring an interconnect enclosure for optical fibers for outside plant management of subscriber optical fiber connectivity include providing a first termination panel in the enclosure having a plurality of optical fiber connection points. The plurality of optical fiber connection points of the first termination panel are optically spliced to respective subscriber locations. A second termination panel is provided in the enclosure having a plurality of optical fiber connection points. The optical fiber connection points of the second termination panel are optically spliced to an optical fiber feeder cable coupled to a central office. A cross-connect module is mounted in the enclosure. The cross-connect module has a loop of an optical fiber retained therein with a first and opposite second connectorized end of the optical fiber extending from the cross-connect module. The connectorized pigtails have a cable length sufficient to allow connection to the plurality of connection points without a jumper therebetween. The first connectorized end is connected to a selected one of the optical fiber connection points of the second termination panel. The second connectorized end is connected to a selected one of the optical fiber connection points of the first termination panel to cross-connect the selected one of the optical fiber connection points of the second termination panel to the selected one of the optical fiber connection points of the first termination panel.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, there elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative tenms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Some embodiments of the present invention provide cross-connect modules for use in fiber optic centralized splitter cabinets/racks/terminals/enclosures (also known as Primary Flexibility Points (PFPs), Fiber Distribution Hubs (FDHs) or Local Convergence Cabinets (LCCs)), fiber optic cross-connect cabinets/racks/terminals/enclosures and/or passive optical networks (PONs). The fiber optic cross-connect module may include a housing, patchcord bend controls and retainers and fiber optic patchcords (jumpers). The housing may closely resemble a splitter module housing also configured for use in the respective cabinet/enclosure and may be mounted in-place of and along side of the splitter module housing within the cabinet. Uniform length patchcords may be utilized for organizational benefits in some embodiments. Patchcords may be factory fixed into the housing of the cross-connect module or field placed into the housing.

Housings with factory fixed patchcords may be closed on all sides and ends with patchcords exiting at one or more ends and may include internal bend control(s) and retaining tabs for patchcords to be "looped" inside the housing. Patchcords may be retained in the housing to resist pull-out. Such a closed end housing will be further described with reference to FIGS. 5A-5C below. Housings with field installed patchcords may be open on one side and one or more ends may include internal bend control(s) and retaining tabs for patchcords to be "looped" inside the housing. Such an open end housing will be further described with reference to FIG. 6 below.

Centralized splitter cabinets are sometimes used as a hybrid centralized splitter cabinet and optical cross-connect cabinet. Cross-connect functionality in a centralized splitter cabinet is sometimes desired or necessary so that splitters, and their associated loss, can be by-passed. By-passing splitters may maintain optical signal strength so that: a) network "reach" (or distance) can be increased from the CO/head end to the end customer; or b) a higher level of signal strength can be provided to a certain customer set, such as to businesses as contrasted with single family residences. Use of such a cross-connect module may allow for organization of cross-connect patchcords within the cabinet. In some embodiments, such an organization is provided using uniform length patchcords that measure about twice the length of splitter module pigtails used in the same cabinet/enclosure. Thus, some embodiments of the present invention may provide an organized way to expand the functionality of new and existing centralized splitter cabinets.

Figure 1:
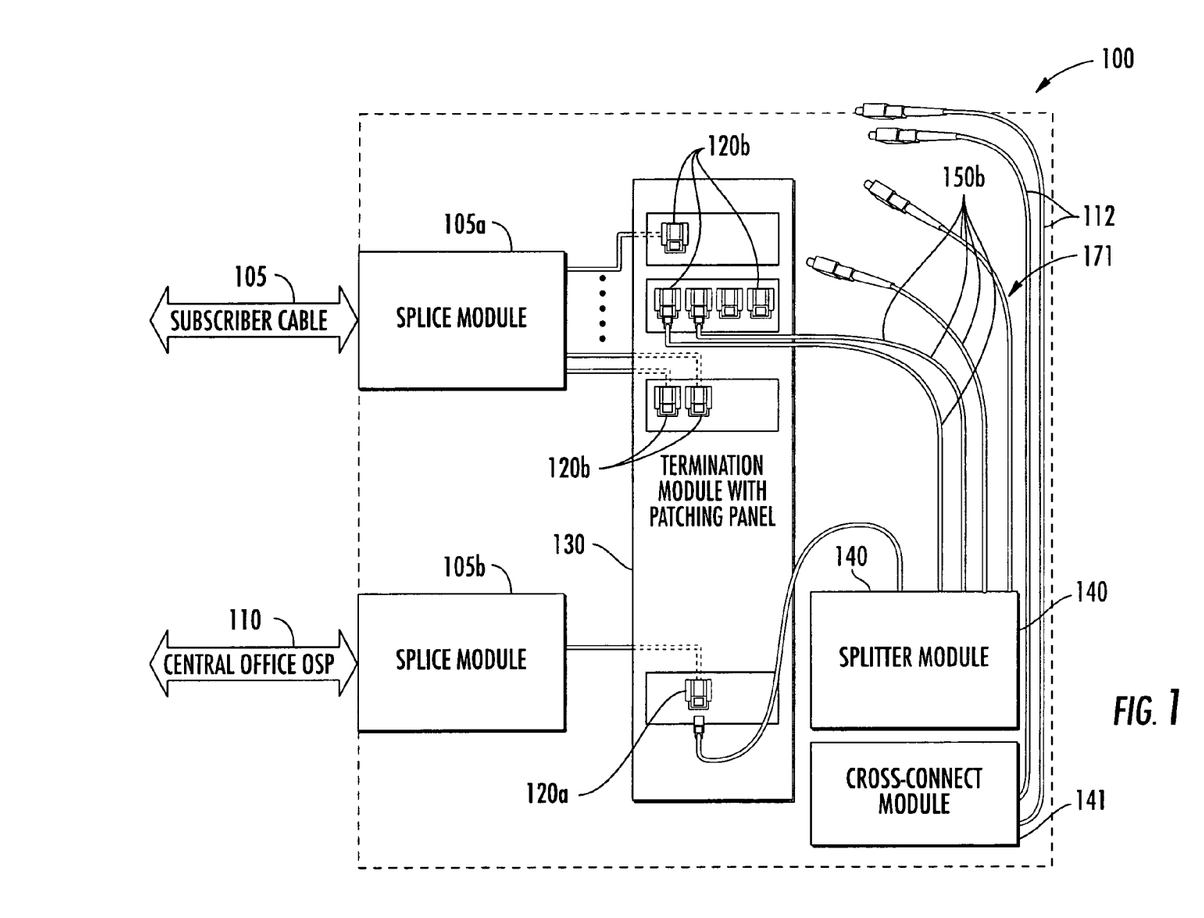
FIG. 1 is a schematic diagram illustrating an interconnect cabinet for optical fibers according to some embodiments of the present invention.

Embodiments of the present invention will now be described with reference to the various embodiments illustrated in FIGS. 1-7. FIG. 1 is a schematic diagram illustrating an interconnect cabinet 100 for optical fibers according to some embodiments of the present invention. As shown in FIG. 1, the interconnect cabinet 100 is used for connecting subscriber cable(s) 105 with the central office outside plant (OSP) cable(s) 110 so as to manage connectivity of subscriber locations to the central office. The interconnect cabinet 100 includes splice modules 115a, 115b, a termination module 130 having a front face that provides a patch panel, a splitter module 140, a cross-connect module 141 and connectorized pigtails 150a, 150b. The termination module 130 may include a first termination panel or portion including a plurality of optical fiber connection points (members) 120b associated with respective subscriber locations and a second termination panel or portion having a plurality of optical fiber connection points 120a associated with service provider(s).

As will be understood by those of skill in the art, the splice modules 115a, 115b may be used to connect optical fibers from the cables 105, 110 to a backside of the optical fiber connection points (members) 120a, 120b. While two splice modules 115a, 115b are illustrated in FIG. 1, more splice modules may be used depending upon the number of fibers to be routed through the interconnection cabinet 100. Furthermore, although a separate splice module 115b is shown for use with the central office cable 110, in various embodiments of the present invention, a common splice module may be used for both the cable fibers of the subscriber 105 and the central office 110. Although splice modules for making such interconnections provide benefits in routing and control of radius of curvature and the like of optical fibers, it will be understood that the present invention, in some embodiments, encompasses other methods of interconnect between the subscriber and central office cables 105, 110 and the fiber connection points 120a and 120b.

As shown in FIG. 1, the splitter module 140 has a connectorized pigtail 150a extending to a fiber connection point 120b to optically couple to a fiber from the central office. The fiber from the central office is connected by the splitter module 140 to the plurality of connectorized pigtails 150b. Thus, each of the connectorized pigtails 150b are associated with an optical fiber feeder cable 110 coupled to a central office, typically through an individual fiber. The splitter module 140 may be a 4 to 1, 8 to 1, 16 to 1, 32 to 1 or the like splitter module based on the desired number of subscribers to be carried and supported by a single fiber feed to the central office.

As illustrated in the embodiments of FIG. 1, ones of the fibers from the subscriber cable 105 associated with different subscriber locations are each coupled to respective ones of the fiber connection points 120b in the patch panel front face of the termination module 130. The connectorized pigtails 150b have a cable length sufficient to allow connection of each of the pigtails 150b to the plurality of connection points 120b. As a result, service to an individual subscriber location may be readily provided or ended by coupling or decoupling one of the connectorized pigtails 150b from the one of the fiber connection points 120b associated with that subscriber. Therefore, providing a readily determined location on the front patch panel of the termination module 130 associated with each specific subscriber may simplify the task of making a connection for a field technician who might otherwise have difficulty locating a pigtail 150b associated with a specific subscriber.

As shown in FIG. 1, the cross-connect module 141 has a first and opposite second connectorized end of an optical fiber 112 extending from the cross-connect module 141. The connectorized ends of the optical fiber 112 extend to a length sufficient to allow cross-connection of a selected pair of the connection points 120a, 120b on the termination module 130 by connection of the connectorized ends of the optical fiber 112 thereto. Thus, the cross-connect module 141 may be used to connect feeder/input panel optical fibers to various distribution ports associated with subscriber locations via a patchcord that is looped back to and within the cross-connect module 141. As will be further described herein, the module 141 may be located in place of or adjacent to the splitter module 140. Such an arrangement may allow a pass-through of a feeder fiber from the central office to any distribution port associated with a particular subscriber location. Such passing-through may enable the network distance from the central office to be extended via the distribution port or additional bandwidth to be delivered to the subscriber location. In addition, the cross-connect module 141 may be used to connect any feeder/distribution port to any other feeder/distribution port in a traditional cross-connect function while providing for improved management of cabling within the cabinet 100. In other words, by routing/locating the cross-connect patchcord (or jumper) in the cross-connect module 141, which is located in a common mounting area with the splitter module 140 within the cabinet 100, patchcord management can follow the fiber management features of the cabinet typically intended for the splitter module 140.

For the embodiments illustrated in FIG. 1, the fiber feed to the central office from the central office cable(s) 110, like the fiber feed of the subscriber cable(s) 105, is coupled through a splice module 115b to an interconnection point 120b on the patch panel front face of the termination module 130. While shown as a separate connection points 120a, 120b in FIG. 1, it will understood that any of the connection points 120b could likewise be used to provide an interconnection to the central office cable(s) 110. It will be further understood that, in some embodiments of the present invention, the input optical fiber to the splitter module 140 is spliced to a fiber in the central office cable(s) 110 directly without use of the termination module 130 and the connectorized pigtail 150a. For example, the input optical fiber to the splitter module 140 could be coupled to a fiber from the central office cable(s) in the splice module 115b.

Figure 2:
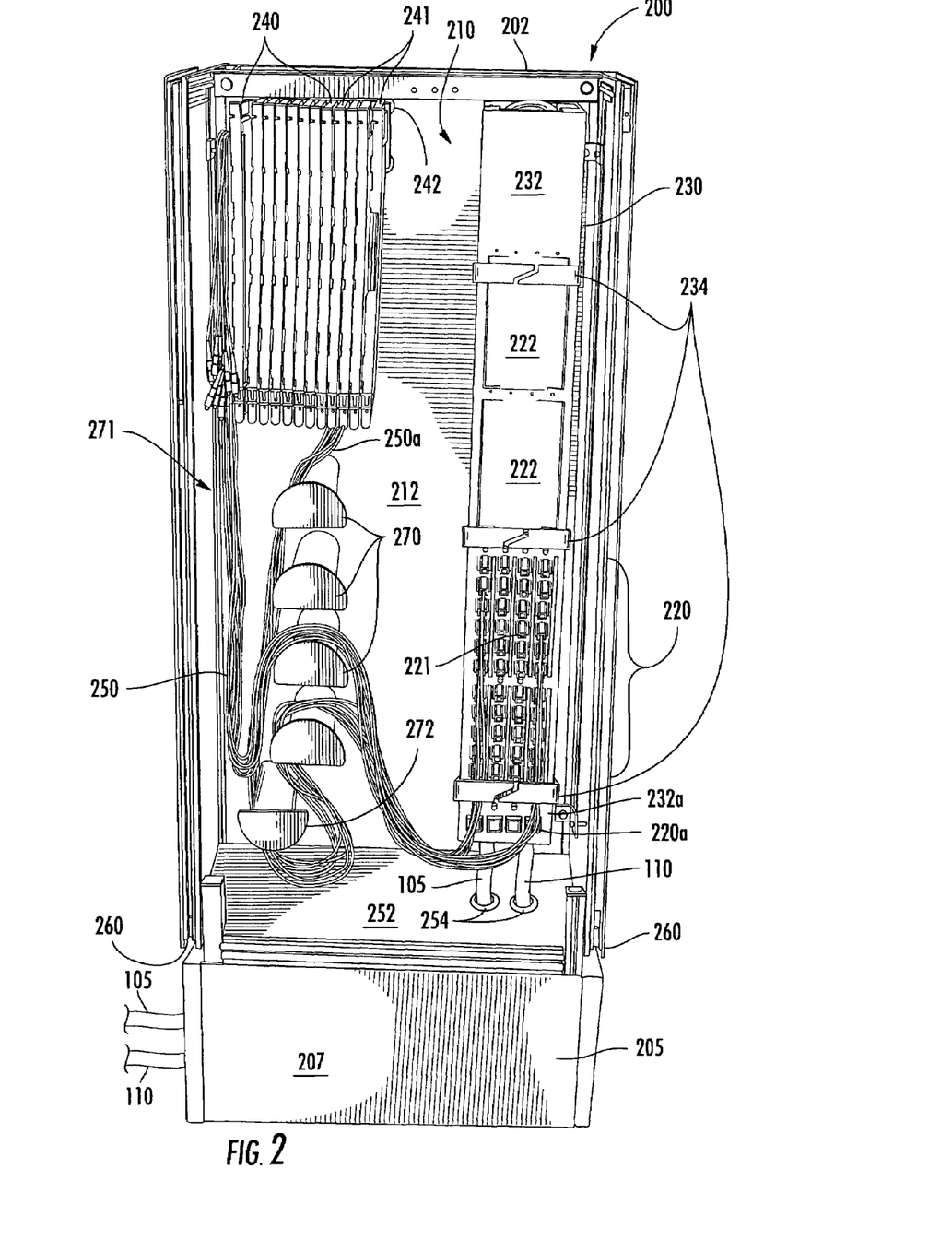
FIG. 2 is a front perspective view of an interconnect cabinet for optical fibers according to some embodiments of the present invention.

The present invention will now be further described with reference to the embodiments of an interconnect cabinet 200 for optical fibers illustrated in FIG. 2. As shown in FIG. 2, the interconnect cabinet 200 includes an enclosure 202 having an upper chamber 210 and a lower chamber 205. The enclosure 202 may be a double-walled housing configured to provide passive cooling for the cabinet 200. The subscriber and central office cables 105, 100 are received in the lower chamber 205, which is protected by a front cover panel 207. The cables 105, 100 feed through a bottom panel 252 positioned between the upper chamber 210 and the lower chamber 205 through grommets 254. Thus, for example, in the embodiments of FIG. 2, the upper chamber 210 may be provided a cleaner or more environmentally controlled environment than the lower chamber 205. However, it will be understood that various embodiments of the present invention may provide for direct routing of the cables 105 and 110 into the upper chamber 210 of a single chamber enclosure not having a separate lower chamber.

As shown in the embodiments of FIG. 2, a termination module 230, a plurality of splitter modules 240 having connectorized pigtails 250, a plurality of cross-connect modules 241 having connectorized ends of an optical fiber 250a extending therefrom and a plurality of spools 270, 272 are positioned in the upper chamber 210 of the housing 202. The termination module 230 is removably mounted to a back wall 212 of the upper chamber 210. The splitter modules 240 and the cross-connect modules 241 are interchangeably and removably mounted to the back wall 212 by brackets 242. In other words, respective mounting locations on the back wall 212, or other splitter and cross-connect module mounting member, may accept either a splitter or cross-connect module, depending on the desired configuration of the cabinet 200. As such, the cross-connect modules 241 may be mounted proximate the splitter modules 240.

The termination module 230 includes a first termination patch panel 232 on its front face that includes a plurality of optical fiber connection points (members) 220 associated with respective subscriber locations. The connection members 220 include sockets (also referred to as adapters or couplings) 221 configured to receive the connectorized plugs of the pigtails 250 or the connectorized ends of the optical fiber 250a extending from the cross-connect modules 241. As also shown in the embodiments of FIG. 2, the termination patch panel 232 may be modified based on the number of optical fibers to be connected by adding additional rows of connection members 220 in the regions 222. Three brackets 234 are shown on the termination module 230 that may be used to rest on a table or other flat surface when the termination panel 232 is rotated open to allow access to a backside of the connection member 220. A second termination panel 232a (or region of the panel 232) may include a plurality of optical fiber connection members 220a associated with service provider(s).

The arrangement illustrated in FIG. 2 may allow for front panel access to the various connectivity components for arranging connections to subscriber locations. As shown in FIG. 2, front side access to the cabinet 200 is provided by opening of the rotatable door panels 260 defining the front panel of the interconnect cabinet 200. However, a single panel door, removable panel or the like could also be provided to allow front side access to the chamber 210.

A pigtail routing path 271 may be configured to route cables 250, 250a from the splitter modules 240 and the cross-connect modules 241 to corresponding selected ones of the termination panels 232, 232a. The pigtail routing path 271 may include the spooling system 270, 272, which may be used to support routing of the pigtails 250 in a manner that may advantageously control bending of the cables 250, 250a to reduce the risk of damage to the optical fiber and provide further organization to the routing of the cables 250, 250a, particularly where a fully loaded interconnect cabinet 200 may include a large number of such cables 250, 250a. The spooling system 270, 272 is mounted in the enclosure 202 and configured to receive and store excess cable length of the connectorized cables 250, 250a.

As also shown in FIG. 2, the spooling system 270, 272 may include an initial loop spool 272 configured to receive all the connectorized cables 250, 250a and provide the cables a common entry point to the spools 270. Thus, all of the cables 250, 250a may first be routed underneath the initial loop spool 272 and then over a selected one of the spools 270 based on the relative distance from the bottom panel 252 of an associated row of the connection members 220 to which the respective cable 250, 250a is to be routed.

A plurality of splitter modules 240 and cross-connect modules 241 and a single termination module 230 are illustrated in FIG. 2. However, as seen by the space between the modules 240, 241 and the termination module 230, a plurality of termination modules 230 may be selectively mounted in the enclosure 202 in some embodiments of the present invention.

Figure 3:
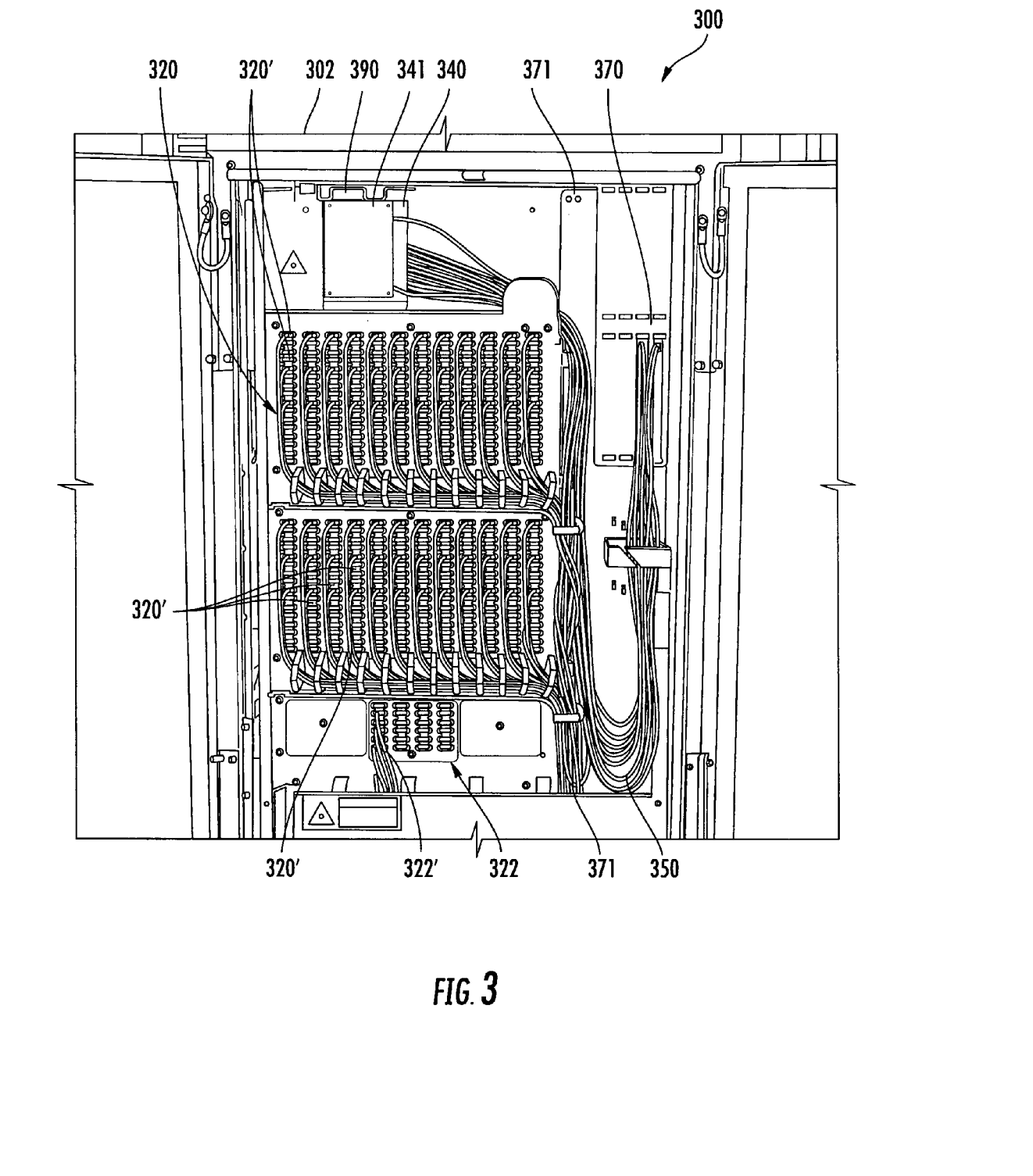
FIG. 3 is a front perspective view of an interconnect cabinet for optical fibers according to some embodiments of the present invention.

An interconnect cabinet 300 for optical fibers according to further embodiments of the present invention will now be described with reference to the perspective view illustration of FIG. 3. As shown in FIG. 3, the cabinet 300 includes an enclosure 302 with first termination panel(s) 320, second termination panel(s) 322, splitters 340 and a cross-connect module 341 mounted therein. More particularly, FIG. 3 illustrates two termination panels 320 each including a plurality of optical fiber connection members 320', ones of which are associated with respective subscriber locations. Similarly, the embodiments in FIG. 3 illustrate a single termination panel 322 having a plurality of optical fiber connection members 322', ones of which are associated with respective input optical fibers associated with a service provider (or providers).

As discussed with reference to FIGS. 1 and 2 above, a plurality of connectorized cables 350 extend from the cross-connect module 341 and the splitter modules 340. In some embodiments, the connectorized cables 350 are of sufficient length to reach selected ones of the optical fiber connection members 320', 322'. Also shown in the embodiments of FIG. 3 is a pigtail routing path 371 in the enclosure 302 through which the respective connectorized cables from the cross-connect module 341 and the splitters (splitter modules) 340 are routed to the corresponding selected one of the termination panels 320, 322.

The enclosure 302 illustrated in FIG. 3 further includes an unused cable retaining member 370 (also referred to as a "parking lot") configured to receive and retain ones of the connectorized cables 350 that are not coupled to the connection members 320', 322' of the termination panels 320, 322. Thus, the connectorized cables 350 from the cross-connect module 341 and the splitters 340 may all be routed through the pigtail routing path 371 to a corresponding selected one of the termination panels 320, 322 or to the unused cable retaining member 370.

As seen in the embodiments of FIG. 3, the enclosure 302 may include a mounting member 390 configured to interchangeably receive a plurality of optical fiber splitter modules 340 or cross-connect modules 341. For example, each of the modules 340, 341 may be trays having a compatible form factor allowing mixed numbers of either configuration tray to be interchangeably attached to respective mounting stations of the mounting member 390, depending upon the desired configuration for the interconnect cabinet 300 in a particular application. Similarly, the unused cable retaining member 370 may have a variable number of "parking" optical fiber connection member elements installed therein that correspond to the number of cables 350 extending from the respective modules 340, 341. As seen in FIG. 3, the unused cable retaining member 370 includes eight total stations configured to receive parking lot devices for unused splitter pigtails, two of which are populated in the illustration of FIG. 3. It will be understood that similar flexibility may be provided in populating the respective termination panels 320, 322.

While described herein with reference to the first termination panel including optical connection members associate with subscriber locations and the second termination panel including optical fiber connection members associated with a service provider, it will be understood that the first termination panel and second termination panel may each be portions of a single termination panel. Furthermore, the first termination panel (section of a single termination panel) may include connection members associated with a service provider and the second termination panel may include connection members associated with subscriber locations. As such, the first and second termination panel of the present invention are not limited to configurations as illustrated in FIG. 2, where the subscriber location connection points and service provider connection points are separated. It will also be understood that, while generally described above with reference to cross-connection of subscriber locations and service providers, the present invention is not limited to such applications and may be used, for example, to cross-connect two subscriber locations and/or two service providers.

Figure 4:
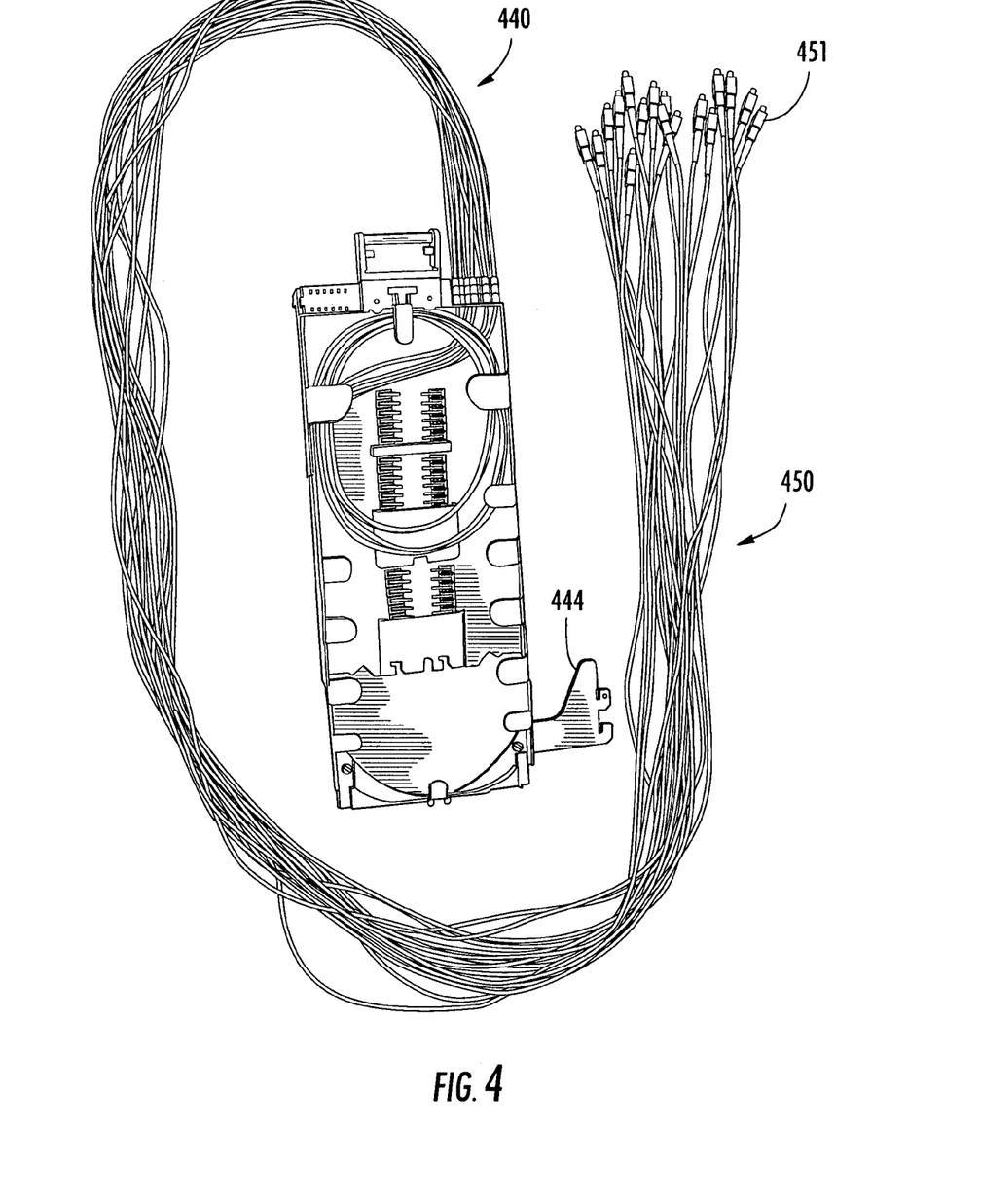
FIG. 4 is a perspective view of an optical fiber splitter/splice tray having a plurality of connectorized pigtails according to some embodiments of the present invention.

FIG. 4 is a perspective view of an optical fiber splitter/splice tray 440 having a plurality of connectorized pigtails 450 according to some embodiments of the present invention. As shown in FIG. 4, a mounting bracket 444 is mounted at one end of the optical fiber splitter/splice tray 440 and the pigtails 450 extend from an opposite end thereof. Connector plugs 451 are provided at the ends of the connectorized pigtails 450. The splitter tray 440 may be held in place in an interconnect cabinet by, for example, tabs and/or a bracket.

Figure 5A:
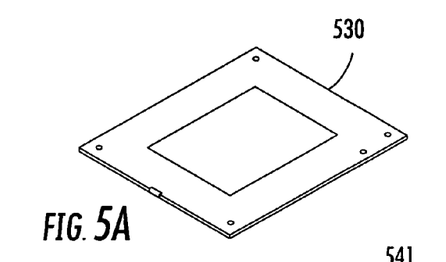
FIG. 5A is an exploded perspective view of an optical fiber cross-connect module according to some embodiments of the present invention.
Figure 5B:
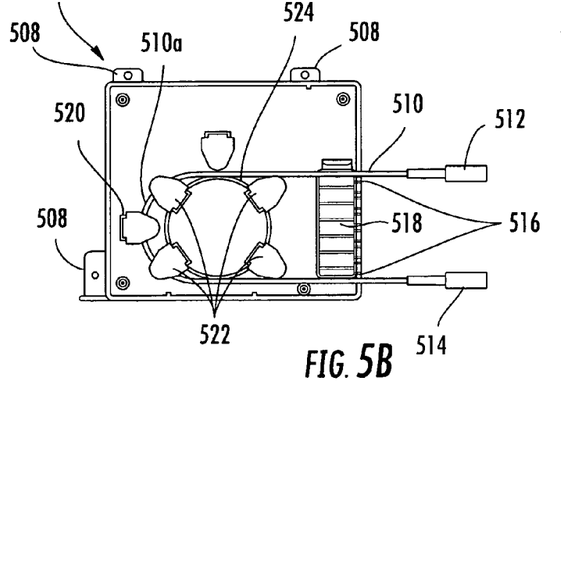
FIG. 5B is a top plan view of the optical fiber cross-connect module of FIG. 5A.
Figure 5C:
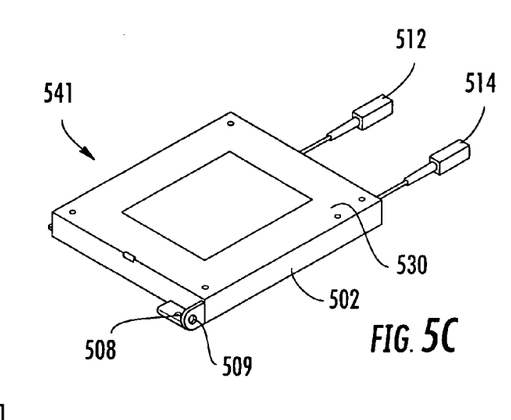
FIG. 5C is a perspective view of the optical fiber cross-connect module of FIG. 5A.
Figure 5D:
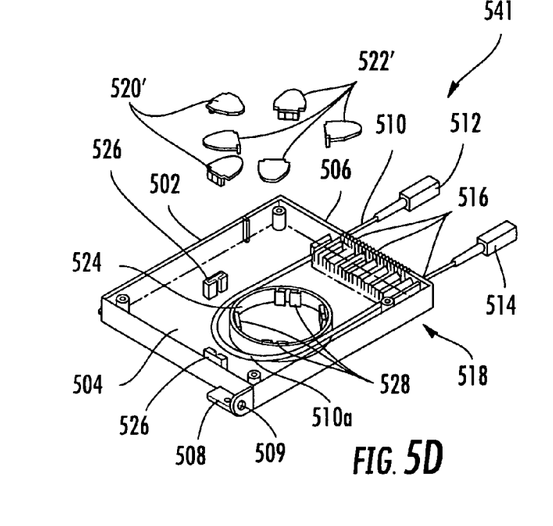
FIG. 5D is an exploded perspective view of the optical fiber cross-connect module of FIG. 5A

Further embodiments of the present invention will now be described with reference to FIGS. 5A-5C. As illustrated in FIGS. 5A-5C a cross-connect module 541 includes a tray 502 having a loop 510a of an optical fiber 510 retained therein. A first connectorized end 512 and an opposite second connectorized end 514 of the optical fiber 510 extend from the cross-connect module 541. The first and second connectorized ends 512, 514 of the optical fiber 510 extend to a length sufficient to allow cross-connection of a selected pair of the connection member 320', 322' (FIG. 3) of the termination panels 320, 322 (FIG. 3) by connection of the connectorized ends 512, 514 thereto. The optical fiber 510 retained in the cross-connect module 541 extends continuously without any splicing therein from the first connectorized end 512 to the second connectorized end 514. Thus, the connectorized ends 512, 514 have a cable length, without a connection (connector or splice) included therebetween, sufficient to allow cross-connection of the optical fiber connection members 320', 322'.

The illustrated embodiments of the cross-connect module 541 in FIGS. 5A-5D further include a plurality of tab members 520, 522 positioned in the cross-connect module 541 to retain the loop 510a of the optical fiber 510 in the cross-connect module 541. A bend control member 524 is also provided that is configured to maintain the loop 510a at a radius at or above the minimum bend radius of the optical fiber. The illustrated bend control member 524 is shown as a circular raised member extending up from a bottom 504 of the tray 502 and extending between respective ones of the tab members 522. As best seen in the exploded perspective view of FIG. 5A, the illustrated tab members include a first segment 526, 528 extending up from the bottom 504 of the tray 502 and a second segment 520', 522'. The second segments 520', 522' are removably coupled to a corresponding one of the first segments 526, 528 and extend substantially orthogonally therefrom over the loop 510a of the optical fiber 510. The first segment 528 in the illustrated embodiments of FIGS. 5A-5D are portions of the bend control member 524.

As illustrated in FIGS. 5A-5C, the cross-connect module 541 includes a closed end 518 from which the connectorized ends 512, 514 of the optical fiber 510 extend. More particularly, the closed end 518 includes optical fiber receiving openings 516 and the first and second connectorized ends 512, 514 of the optical fiber 510 extend from respective ones of the optical fiber receiving openings 516. The cross-connect module 541 further is shown as including a cover 530 that may be removably secured to the tray 502 as shown in FIG. 5C. In addition, the tray 502 includes attachment members 508 configured for use in attaching the cross-connect module 541 to a mounting member in an enclosure, such as the enclosure 202, 302. A further attaching portion 509 extends in a plane substantially orthogonal to the attaching tabs 508 to allow attachment of the cross-connect module 541 extending from rather than flush to the mounting surface.

While shown in FIGS. 5A-5C as including only a single optical fiber 510 retained in the cross-connect module 541, it will be understood that, in some embodiments of the present invention, a plurality of optical fibers may be retained in the cross-connect module, each of which has a first and second connectorized end extending from the cross-connect module 541 to allow cross-connection of a plurality of selected pairs of the connection members 320', 322' (FIG. 3). The respective ends may extend through different ones of the openings 516 on the closed end 518 of the cross-connect module 541. The one or more cross-connections between respective ones of the connection members 320', 322' may be provided without use of a jumper cable therebetween using the optical fiber 510 without any splicing therein.

Figure 6:
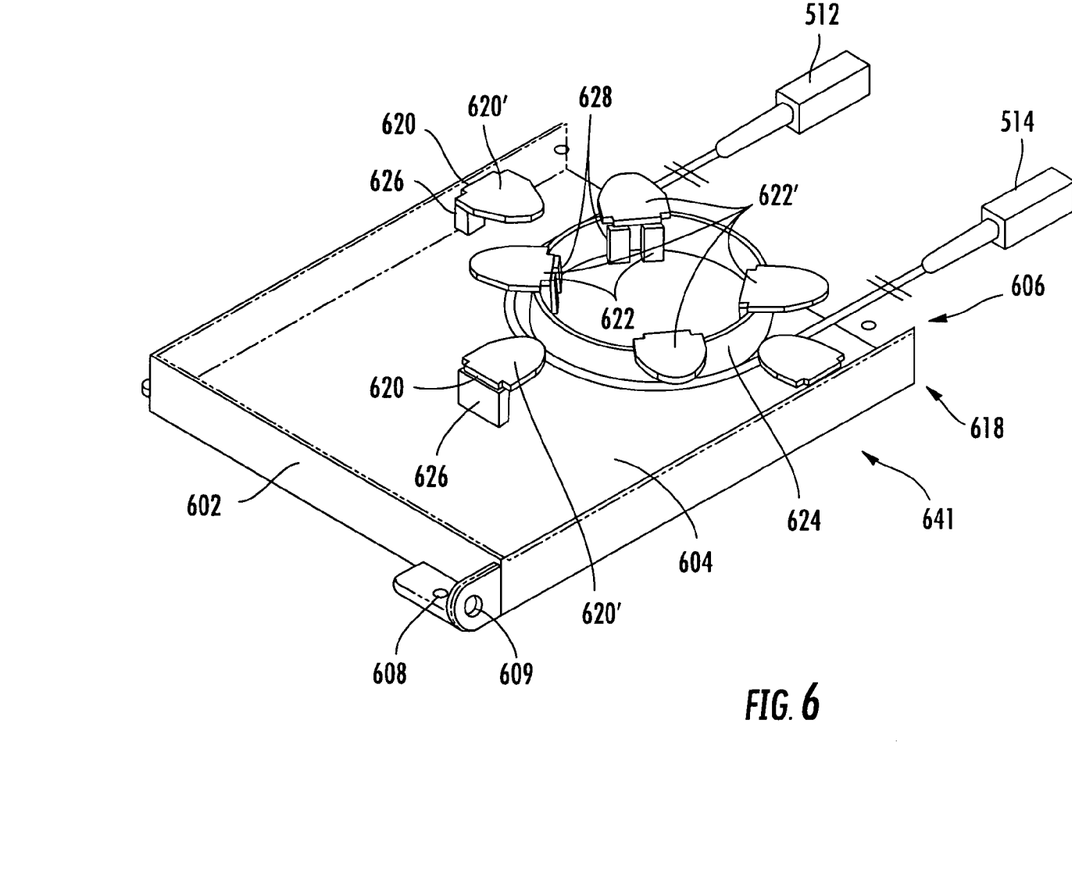
FIG. 6 is a perspective view of an optical fiber cross-connect module according to further embodiments of the present invention.

Further embodiments of the present invention will now be described with reference to FIG. 6. As shown in FIG. 6, a cross-connect module 641 may include a tray 602 having a plurality of tab members 620, 622 and bend control member 624 positioned therein. More particularly, as described with reference to FIG. 5, the tab members may include a first segment 626, 628 extending up from a bottom 604 of the tray 602 and a second segment 620', 622' extending substantially orthogonally from the corresponding first segment 626, 628 over the loop 510a of the optical fiber 510. The embodiments in FIG. 6 further include attachment features 608, 609 generally corresponding to the attachment features 508, 509 described with reference to FIGS. 5A-5C.

The embodiments illustrated in FIG. 6 differ from those described with reference to FIGS. 5A-5C in that they have an open end 618 from which the first and second connectorized ends 512, 514 of the optical fiber 510 extend. It will be understood that embodiments such as illustrated in FIG. 6 may be advantageous for field installation of the optical fiber 510 in the cross-connect module 641 as they may provide for easier access to a technician. In contrast, the embodiments illustrated in FIGS. 5A-5C may be particularly advantageous for factory installation of the optical fiber 510 in the cross-connect module 541.

Figure 7:
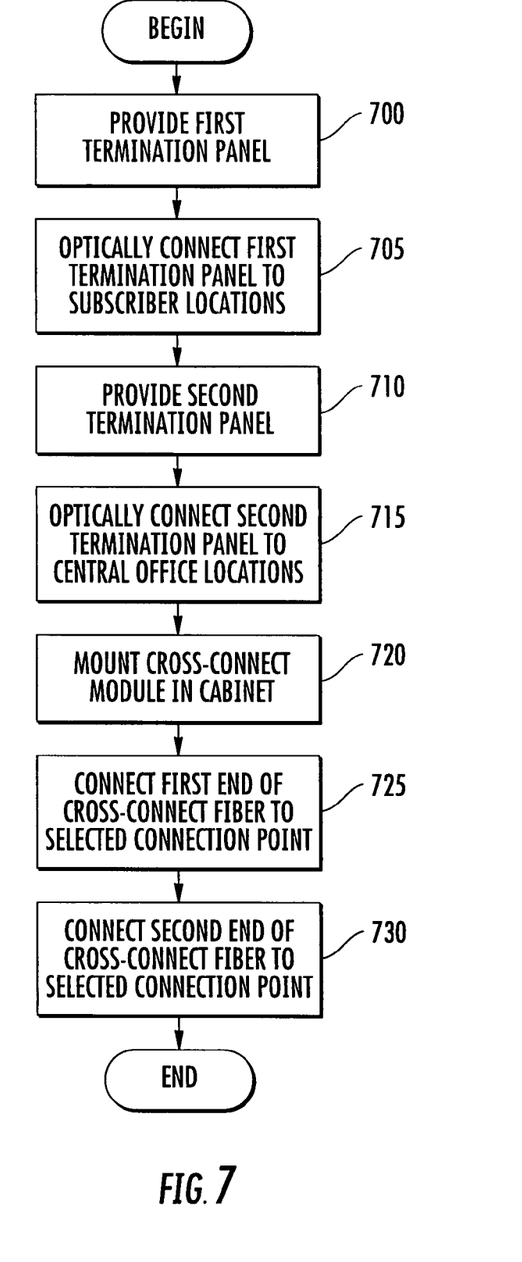
FIG. 7 is a flowchart illustrating methods for outside plant management of optical fiber connectivity according to some embodiments of the present invention.

A method for configuring an interconnect cabinet for optical fibers for outside plant management of subscriber optical fiber connectivity according to some embodiments of the present invention will now be described with reference to the flowchart illustration of FIG. 7. As shown in FIG. 7, operations begin by providing a first termination panel in the cabinet having a plurality of optical fiber connection points (block 700). The plurality of optical fiber connection points of the first termination panel are optically spliced to respective subscriber locations (block 705). A second termination panel having a plurality of optical fiber connection points is provided in the cabinet (block 710). The optical fiber connection points of the second termination panel are optically spliced to an optical fiber feeder cable coupled to a central office (block 715).

A cross-connect module is mounted in the cabinet (block 720). The cross-connect module has a loop of an optical fiber retained therein with a first and second opposite connectorized end of the optical fiber extending from the cross-connect module. The connectorized pigtails have a cable length, without a splice, therein sufficient to allow connection to the plurality of connection points without a jumper therebetween.

The first connectorized end is connected to a selected one of the optical fiber connection points of the second termination panel (block 725). The second connectorized end is connected to a selected one of the optical fiber connection points of the first termination panel to cross-connect the selected one of the optical fiber connection points of the second termination panel to the selected one of the optical fiber connection points of the first termination panel (block 730).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. An interconnect device for optical fibers, comprising:
   an enclosure;
   a first termination panel mounted in the enclosure and having a plurality of optical fiber connection members, ones of which are associated with respective subscriber locations;
   a second termination panel mounted in the enclosure and having a plurality of optical fiber connection members, ones of which are associated with respective input optical fibers associated with a service provider; and
   a cross-connect module mounted in the enclosure and having a loop of an optical fiber retained therein with a first and opposite second connectorized end of the optical fiber extending from the cross-connect module, the first and second connectorized ends of the optical fiber extending to a length sufficient to allow cross-connection of a selected pair of the connection members of the termination panels by connection of the connectorized ends thereto.

2. The interconnect device of claim 1, wherein the optical fiber retained in the cross-connect module extends continuously without any splicing therein from the first connectorized end to the second connectorized end.

3. The interconnect device of claim 1, wherein the cross-connect module includes a plurality of tab members therein positioned to retain the loop of the optical fiber in the cross-connect module.

4. The interconnect device of claim 3, further comprising a bend control member positioned between respective ones of the tab members configured to maintain the loop at a radius that at least equals a minimum bend radius of the optical fiber.

5. The interconnect device of claim 4, wherein the cross-connect module comprises a tray and wherein the tab members include a first segment extending up from a bottom of the tray and a second segment, removably coupled to the first segment, that extends substantially orthogonally from the first segment over the loop of the optical fiber.

6. The interconnect device of claim 5, wherein the first segments of the tab members comprise portions of the bend control member.

7. The interconnect device of claim 1, wherein the cross-connect module includes an open end and wherein the first and second connectorized ends of the optical fiber extend from the open end of the cross-connect module.

8. The interconnect device of claim 1, wherein the cross-connect module includes closed end including optical fiber receiving openings and wherein the first and second connectorized ends of the optical fiber extend from respective ones of the optical fiber receiving openings.

9. The interconnect device of claim 1, wherein the cross-connect module includes a plurality of optical fibers retained therein, each of which has a first and second connectorized end extending from the cross-connect module to allow cross-connection of a plurality of selected pairs of the connection members.

10. The interconnect device of claim 1, further comprising a splitter mounted in the enclosure that is configured to optically couple a plurality of optical fibers to a single optical fiber and having a plurality of optical fiber connectorized pigtails extending therefrom, each of the connectorized pigtails being optically coupled by the splitter to an optical fiber feeder cable to be coupled to a central office.

11. The interconnect device of claim 10, wherein the connectorized pigtails have a cable length from the first end to the second end, without a connector therebetween, sufficient to allow connection to the plurality of connection members.

12. The interconnect device of claim 10 further comprising an optical fiber cable from the central office coupled to the input optical fibers associated with the service provider and optical fiber cables from the subscriber locations coupled to the plurality of connection members of the first termination panel.

13. The interconnect device of claim 10 wherein the splitter comprises an optical fiber splitter tray and the cross-connect module comprises a cross-connect tray and wherein the enclosure includes a mounting member configured to interchangeably receive a plurality of optical fiber splitter and/or cross-connect trays.

14. The interconnect device of claim 13, wherein the enclosure further includes an unused cable retaining member configured to receive and retain ones of the connectorized pigtails of the splitter tray or connectorized ends extending from the cross-connect tray that are not coupled to the connection members of the termination panels.

15. The interconnect device of claim 13, wherein the enclosure further comprises a pigtail routing path and wherein both the connectorized pigtails and the connectorized ends extending from the cross-connect tray are routed through the pigtail routing path to a corresponding selected one of the first termination panel, the second termination panel or the unused cable retaining member.

16. An interconnect device for optical fibers, comprising:
an enclosure;
a first termination panel mounted in the enclosure and having a plurality of optical fiber connection members, ones of which are associated with respective subscriber locations;
a second termination panel mounted in the enclosure and having a plurality of optical fiber connection members, ones of which are associated with respective input optical fibers associated with a service provider;
a splitter and cross-connect module mounting member mounted in the enclosure that is configured to interchangeably receive a plurality of optical fiber splitter and/or optical fiber cross-connect members;
a cross-connect module mounted in the mounting member and having a loop of an optical fiber retained therein with a first and opposite second connectorized end of the optical fiber extending from the cross-connect module, wherein the optical fiber retained in the cross-connect module extends continuously without any splicing therein from the first connectorized end to the second connectorized end and wherein the first and second connectorized ends of the optical fiber extend to a length sufficient to allow cross-connection of a selected pair of the connection members of the termination panels by connection of the connectorized ends thereto;
a splitter mounted in the mounting member proximate the cross-connect module that is configured to optically couple a plurality of optical fibers to a single optical fiber and having a plurality of optical fiber connectorized pigtails extending therefrom, each of the connectorized pigtails being optically coupled by the splitter to an optical fiber feeder cable to be coupled to a central office; and
a pigtail routing path in the enclosure, wherein both the connectorized pigtails and the connectorized ends extending from the cross-connect module are routed through the pigtail routing path to a corresponding selected one of the first termination panel or the second termination panel.

17. The interconnect device of claim 16, wherein the enclosure further includes an unused cable retaining member configured to receive and retain ones of the connectorized pigtails of the splitter or connectorized ends extending from the cross-connect module that are not coupled to the connection members of the termination panels and wherein both the connectorized pigtails and the connectorized ends extending from the cross-connect module are routed through the pigtail routing path to a corresponding selected one of the first termination panel, the second termination panel or the unused cable retaining member.

18. The interconnect device of claim 16, wherein the cross-connect module includes a plurality of tab members therein positioned to retain the loop of the optical fiber in the cross-connect module and a bend control member positioned between respective ones of the tab members configured to maintain the loop at a radius that at least equals a minimum bend radius of the optical fiber.

19. The interconnect device of claim 16, wherein ones of the connectorized pigtails and the connectorized ends extending from the cross-connect module are coupled to corresponding respective ones of the connection members on the first or the second termination panel without a jumper cable therebetween.

20. A method for configuring an interconnect enclosure for optical fibers for outside plant management of subscriber optical fiber connectivity, comprising:

providing a first termination panel in the enclosure having a plurality of optical fiber connection points;

optically splicing the plurality of optical fiber connection points of the first termination panel to respective subscriber locations;

providing a second termination panel in the enclosure having a plurality of optical fiber connection points;

optically splicing the optical fiber connection points of the second termination panel to an optical fiber feeder cable coupled to a central office;

mounting a cross-connect module in the enclosure, the cross-connect module having a loop of an optical fiber retained therein with a first and opposite second connectorized end of the optical fiber extending from the cross-connect module, the connectorized pigtails have a cable length sufficient to allow connection to the plurality of connection points without a jumper therebetween;

connecting the first connectorized end to a selected one of the optical fiber connection points of the second termination panel; and     connecting the second connectorized end to a selected one of the optical fiber connection points of the first termination panel to cross-connect the selected one of the optical fiber connection points of the second termination panel to the selected one of the optical fiber connection points of the first termination panel.

\* \* \* \* \*